United States Patent [19]

Butler

[11] Patent Number: 5,215,575
[45] Date of Patent: Jun. 1, 1993

[54] RECOVERY OF GOLD, SILVER AND PLATINUM GROUP METALS WITH VARIOUS LEACHANTS AT LOW PULP DENSITIES

[76] Inventor: Dean R. Butler, P.O. Box 232, Hahndorf South Australia, 5245, Australia

[21] Appl. No.: 752,561
[22] PCT Filed: Mar. 6, 1990
[86] PCT No.: PCT/AU90/00086
§ 371 Date: Oct. 4, 1991
§ 102(e) Date: Oct. 4, 1991
[87] PCT Pub. No.: WO90/10721
PCT Pub. Date: Sep. 20, 1990

[30] Foreign Application Priority Data

Mar. 7, 1989 [AU] Australia ............... PJ3079
Jun. 22, 1989 [AU] Australia ............... PJ4840

[51] Int. Cl.$^5$ ............................... B01G 5/00
[52] U.S. Cl. ............................... 75/744
[58] Field of Search ............................... 75/744

[56] References Cited

U.S. PATENT DOCUMENTS 4,654,078  3/1987  Perez ............................... 75/744
4,971,625 11/1990  Bahr ............................... 75/744
4,980,134 12/1990  Butler ............................... 75/744

*Primary Examiner*—Peter D. Rosenberg
*Attorney, Agent, or Firm*—Synnestvedt & Lechner

[57] ABSTRACT

In the recovery of noble metals, including gold, silver and members of the platinum group, the ores or tailings are subjected to the action of various leaching agents, namely, sodium cyanide, thiourea, chlorine and aqua regia and optionally a leaching aid, such as chloride ions. The resulting slurry is then diluted to an optimum pulp density of 0.1 to 10.0% and allowed to stand in a holding tank for periods up to 30 minutes, preferably 15 minutes, with the optional addition of a dispersant, such as sodium silicate, sodium carbonate, trisodium polyphosphate or sodium hexametaphosphate. The pulp is then centrifuged to remove solids if necessary and is then passed at a pH <9 through a column containing activated carbon or ion exchange resin/fibre to adsorb any precious metal in solution in the liquor. This is followed by desorption and the cycle repeated as often as warranted by the economics of the process. Alternatively, the pulp is filtered and the filtrate subjected to various recovery techniques, such as cementation, solvent extraction, electrowinning and precipitation.

17 Claims, No Drawings

RECOVERY OF GOLD, SILVER AND PLATINUM GROUP METALS WITH VARIOUS LEACHANTS AT LOW PULP DENSITIES

This invention relates to improvements in recovery of noble metals from ores and tailings. Throughout this specification noble metals are intended to include gold, silver and the platinum group.

This invention is partly predicated on the discovery that noble metals in extremely fine form are often present in higher concentrations than is revealed by normal assay techniques in common use.

For example, platinum or gold ores can contain more metal than that recovered in conventional wet chemical or fire-assay methods. It is thought that where there are metal absorbing materials such as clay, carbon, or sulfides in the ore or other metals being analysed, some of the metal taken into solution becomes adsorbed onto these materials and is not detected. In the case of gold leached into solution by aqua regia in wet assays or by cyanide in the cyanide extraction process, the gold complex becomes absorbed by clay, carbon, sulfides, or other material and is thus undetected by solution assay. In the fire assay technique, because clays convert to a boron silicate glass under fire assay conditions, gold is also lost to detection in that technique. Conventionally, gold leached by the cyanide process, usually at pulp densities of 35 to 50% may be recovered from the leach solution in a subsequent stage by contacting the solution or pulp with activated carbon, usually in a concentration range of 10 to 20 grams of carbon per liter of solution (carbon in pulp (CIP) process), but on occasions up to 40 grams per liter have been used. In some instances the carbon has been added to the leaching circuit as well (CIL process), in the same concentration ranges in order to improve gold leach rates so that the gold recorded equated with the assayed grade of the ore.

Particular treatments for clay or sulfide ores have been proposed. Australian Patent 569175 treats sulfide ores in a pressure oxidation step prior to cyanide leaching. After leaching, the pulp is diluted by washing to improve the flocculation in the subsequent thickening stage, following which the liquor is separated from the pulp. Gold is then extracted from solution and the concentrated pulp is then subjected to a carbon in leach circuit at 35 to 40% solids to extract further gold.

The conventional assay technique for gold is either by the wet method, which is leaching with aqua regia followed by measurement of the dissolved gold by atomic absorption spectroscopy or similar techniques, or by fire assay. In some instances when the recovery of gold by the CIP process was not up to the assayed grade, adoption of the CIL process, with addition of carbon to the leach circuit resulted in increased recovery. The amount of carbon was increased, in some cases to 40 grams per liter, until the head grade recovery was achieved. In other instances, the Carbon in leach (CIL) process was adopted to improve gold leach rates and gold recovery rates and thereby decrease the required number of carbon contacting tanks, thus decreasing the capital cost of construction of the gold recovery plant. In some circumstances, however, increasing the carbon loading to the leach vessel, or the subsequent contacting stages, was found to be undesirable because of the formation of fine carbon particles caused by attrition during pulp agitation. The consequent loss of carbon with its attached gold reduced the effectiveness of the process. However prior to this invention it was not suspected that there were also undetected values of metal in some ore samples. These comments also apply to ore concentrate and tailings.

It is an object of this invention to improve recovery rates of noble metals including gold or other valuable metals from ores particularly clay containing ores.

In another aspect of the invention, there is provided a method of recovering metal values by the leaching method in which the pulp density of the slurry is adjusted to below 15% either, prior to, during, or at the end of the leaching stage and subsequent to the leaching step localized zones of high pulp density are avoided.

Pulp is defined as a mixture of one or more solids with one or more liquors. Pulp density is defined by Arthur F Taggart in his book "Handbook of Mineral Dressing" as "the decimal fraction of solids in pulp, by weight." This is commonly referred to as a percentage figure, calculated as the decimal fraction of solids in pulp, by weight, multiplied by one hundred."

By lowering the pulp density as compared to conventional processes, such as in the cyanide leaching process for gold ores where pulp densities in the range of 35 to 55% are normally used, more noble metal, particularly gold, is recovered than by conventional processes and in some cases gold recovery is higher than the assayed value obtained by using conventional assay technique.

Processes according to this invention utilizing collectors such as carbon or ion exchange resins generally have pulp densities in the collection stage less than 15%, preferably 0.1 to 10% more preferably 0.5% to 2%. The low pulp density may be used in the leaching stage or alternatively conventional pulp densities may be employed in the leaching stage or the pulp may then be diluted to densities of less than 15% prior to the stage in which noble metal is recovered from solution.

Once the dilution of the pulp has occurred, it is an important aspect of this invention to minimize the occurrence of localized zones in the slurry or in the recovery process in which the pulp density is above 15% or higher than the preferred dilution.

Another alternative is to carry out the dilution in stages by separating the liquor from the solids as they leave the leaching circuit, sending the liquor to the recovery stage to recover some metal from solution and treating the separated solids with more leach liquors at a pulp density below 30% to recover further noble metal and again separating the solids from the liquor. The stages can be repeated until it is no longer economic to continue the process.

In this way, the solids are contacted with a large volume of liquor in total, even though most of the liquor may be a relatively small recirculating volume having multiple contacts with the solids. Separation of the liquor from the solids may be accomplished by any of the conventional methods, including centrifugation, filtration, decantation or similar. Leaching may also be performed at the higher pulp densities followed by dilution and recovery of noble metal by using a collector in an extended contactor circuit in which a tank/s containing carbon or other collector is followed by a desorption tank/s containing little or no carbon. Thus the sequence of metal desorption from the solids and adsorption onto the collector is maintained, but with a lesser inventory and attrition of the collector than if each tank in the extended circuit contained normal levels of collector material. The collector material may be carbon, ion exchange resins, chelating resins or polymeric adsorbent resins hereinafter referred to as resins.

In one preferred aspect of this invention it has been discovered that a higher recovery of the noble metal can be obtained if a lixiviant or leaching aid in addition to the leaching agent is used. A preferred lixiviant or leaching aid is chloride ions obtained, for example, from sea water. Chloride ion concentration is preferably in the range of 10 to 100 grams per liter.

Methods of recovering the leached material from solution need not be restricted to using collectors such as carbon, resins and other adsorbents, but may include methods such as zinc cementation, cementation, solvent extraction, electrowinning and precipitation. These alternative methods may be necessary to recover the gold or other metal from solution in an alternative procedure in which a relatively short chain, polar, soluble organic material such as methanol or acetone is added to the pulp. The organic material, in the case of gold leaching, will alter the dielectric constant of the solvent and allow more gold to be desorbed into the liquor than would normally be desorbed without the organic material present. When carbon or resins are used as collectors, the organic material may interfere with the adsorption of gold by these materials and thus lower the recovery of gold from the liquor.

Testwork carried out has shown that the loading of gold onto carbon, both at high and low pulp densities and at high and low cyanide concentrations, is a reversible reaction. There is a tendency for both the ore particles and the carbon to absorb gold from cyanide solution. The term "ore" can also mean ore concentrates, tailings, or other noble metal containing solids. A reversible equilibrium is formed between the ore particles, the leach and the carbon. At high pulp densities ($>30\%$), this equilibrium favours the ore particles. As the pulp density is lowered, the equilibrium moves toward the leach and carbon. At low pulp densities ($<5\%$), the equilibrium is also affected by both the cyanide concentration and pH. As the cyanide concentration is lowered, the equilibrium moves back toward the ore particles. If the pH is too high, the equilibrium will favour the ore particles and liquor rather than the carbon. The distribution of gold between the three phases is time dependent, in that for leaches where the conditions do not favour the carbon side of the equilibrium, the gold will unload from the carbon and load back into the ore particles. It is for this reason that localized zones of high pulp density are to be avoided as gold recovery will be reduced.

Thus the dilution of the pulp density according to the present invention is for a different purpose to the dilution washing step disclosed in Patent 569175 where the dilution step assists in reducing the amount of flocculant required in the subsequent thickening and separation step. In contrast to the present invention, Patent 569175 is not attempting to increase solution of gold and is not attempting to recover gold above the conventional assay of value.

In another aspect, the present invention, provides a method of recovering noble metal values, particularly platinum, silver or gold, in which a noble metal bearing ore is leached with a leach solution to dissolve the metal in the presence of at leas 65 grams per liter of a carbon source material or a resin having metal absorption properties.

This process ensures increases in gold recovery. When certain ore types such as those having clay, carbon, or sulfide materials in the ore are treated according to this invention, metal values recovered are greater than the assay grade of the ore when measured by conventional assay. For clay and silica containing ores, dilution below 10% shows immediate improvement in gold recoveries, but for sulphidic ores, dilution below 2% appears to be necessary for economically significant improvement in recovery.

Again these observations also apply to other noble metals. The recovery of the noble metal onto the collector may be achieved by adding the collector (e.g. carbon or resin) or the pulp on a recirculating tank or alternatively using a series of short columns packed with a collector through which the solution is passed a number of times so that the amount of collector exposed to each liter of solution is of the same order as that required in the recirculating tank.

The gold complexes are removed from solution and taken up by solids by several possible mechanisms. They include (1) Ion exchange, (2) physical absorption, (3) chemical absorption (4) direct reduction, (5) method (1) or (2) followed with partial or complete reduction depending on the solid and the environment, (6) partial or complete complexation. The mechanism employed on any particular solid particle is dependent on both the solids type and the chemical and physical conditions in place at that time.

Accordingly, the present invention is able to achieve recoveries of noble metal values such as gold which are greater than conventional assay grades by simply contacting the leach solution with gold adsorbent carbon source material or exchange resins. With conventional pulp densities of 35 to 55% ore by weight, carbon or resin concentrations greater than 65 grams per liter are preferred, with a more preferred range being above 300 grams per liter. Where lower pulp densities are used as taught by this invention, an even higher gold recovery is possible and carbon concentrations of from 100 to 300 grams per liter are practicable.

It is essential when considering increases in carbon or resin loadings to increase the carbon or resin concentrations in relation to the quantity of the ore in the pulp. In order to achieve improved recovery of gold above the conventional assay grade, at least 80 kilograms of carbon source material per tonne or ore should be used. It is preferred to use at least 90 kilograms per tonne and more preferably to use above 100 kilograms of carbon per tonne of ore. This increase in carbon loading per tonne of ore can be achieved either by adding more carbon, or by reducing the pulp density and maintaining the carbon concentration per liter. Where a recovery medium other than carbon is used e.g. ion exchange resin, the medium is to be used in concentrations that will produce the same gold adsorbing capacity as activated carbon at the concentrations recommended for this invention.

In a further aspect of the leaching process, dispersants are added to the pulp to aid in the separation of the solids particles. It is thought that in the absence of very low (around 1%) pulp densities, a gold complex which is desorbed from a solids particle is likely to be adsorbed by another solids particle if these solids particles are in close proximity. Dilution increases the distance between these particles and the dispersant ensures that there is uniform separation. Any suitable dispersants may be used. Preferred dispersants are sodium silicate, sodium carbonate, tri-sodium polyphosphate and sodium hexametaphosphate. By leaching at a very low pulp density with moderate agitation, the pulp solids may be naturally maintained in a condition of separation where by the Freundlich adsorption equation ($C_3 = kC_A^n$ where $C_3$ is the concentration of gold per unit area of the solids, $C_A$ is the concentration of gold per unit volume of the pulp liquor, k and n being constants) describes the gold distribution in the pulp between the solids and the liquor. At higher pulp densities the solids particles proximity effect predominates and alters the gold distribution in the pulp in favour of the solids particles. This solids particles proximity effect may be lessened by the introduction of one or more dispersants into the pulp. By maintaining discrete solids particles rather than agglomerates of flocs, the dispersant lessens the likelihood of a gold complex being desorbed from one solids particle and then immediately being adsorbed by an adjacent solids particles.

The addition of the carbon material may require redesign of the subsequent carbon contacting circuit due to the increased carbon concentrations. By selection of a harder grade of carbon and control of agitation, the attrition of the carbon particles expected at such high loadings can be reduced.

For gold extraction the preferred method of leaching, desorption and adsorption is as follows. The leaching is performed in a cyanide solution at a relatively high pulp density to minimise tankage requirements. At the end of the leach cycle the pulp is diluted to a low pulp density (less than 30%) and maintained for a minimum period of time in a holding tank. The pulp density and time will both vary according to the type and grade of the material being leached, the ore type, the liquor type and the leachant. For most gold ores the economic optimum pulp density lies between 0.1 and 10% and the residence time in the holding tank is up to 30 minutes preferably 15 minutes. The pulp is then preferably centrifuged with a short residence time in the centrifuge to separate solids from the liquor. Either liquor separated from the solids or unseparated pulp is then passed through a column containing an absorbent material such as carbon or resin to absorb the gold which is present in the liquor. The pulp so treated will then desorb more gold into the liquor which is either barren or containing only low levels of gold, this desorption occurs to maintain the constant ratio of gold per unit area of solids/gold per unit volume of liquor. If the centrifuge separation step has been carried out the solids may be recombined with gold depleted liquor to extract further gold from the solids. As the concentration of the gold per unit area of solids is lowered, so the amount of desorption of gold from the solids into the liquor is lowered. It has been observed than when the pH of the pulp is alkaline (>9) the collection efficiency of the carbon collector is inhibited. If the pulp was to be in contact with the carbon throughout this desorption stage until such time as the gold had desorbed to the equilibrium level for that pulp density, an extremely long and economically unviable contact time would be required. Not only would the operating costs be very high, but the capital costs would be immense.

This desorption effect, which occurs both in the presence and absence of carbon, may be utilised to aid the overall process. This is accomplished by using a short column of carbon to adsorb the majority of the gold from the liquor and then placing the pulp into an agitated tank containing little or no carbon. This allows the pulp enough residence time to desorb gold into the liquor to either the maximum level attainable in relation to the gold grade on the solids, or to such lower levels as may be desired by the operator. The pulp is then passed through a second carbon column and into a second desorption tank. This cycle may be repeated until the value of the gold recovered per cycle is not greater than the cost of setting up and operating for that cycle. At any stage in these cycles the pulp density may be lowered one or more times to increase the gold recovery.

In all stages of the process, it is important that zones of high pulp density are not allowed to contact the pulp or partially clarified liquor in the interval between pulp dilution and the completion of adsorption of the metal onto the adsorbent. If a zone of high pulp density is allowed to form in this interval, then the metal values will be absorbed onto the solids in this high pulp density zone and will thus not be available for recovery by the process adsorbent. If the process adsorbent has surface irregularities or internal pores where solids in the pulp may collect to form zones of localised high pulp density, then these solids will absorb the metal values in preference to the process adsorbent. With clay or fine ore particles present in the pulp, a slime layer may coat the surface of the carbon. Thus with process adsorbents such as carbon or ion exchange resins which have surface structures capable of hosting these localised high pulp density zones, the preferred method of recovering the noble metal values is by contacting the process adsorbent with a clarified liquor. The method of production of this clarified liquor must be such that no zones of high pulp density are formed, or if they are, that their area of contact with the pulp or resultant clarified liquor is minimal and such contact occurs for a minimum period of time.

If a solids removal step is not used, the collectors used such as zinc or ion exchange fibres must not cause pulp solids to form localized high pulp density zones.

Throughout this specification the preferred method is described in relation to gold recovery using cyanide leaching and carbon recovery. The process is equally applicable to other noble metal values using the appropriate leaching solution and the appropriate recovery adsorbent such as a resin.

In another aspect, the present invention provides an improved wet assay technique for metal values, particularly gold. If an aqua regia leach, which is being performed on an ore sample, has carbon material added to the liquor, some gold will report to the liquor and some gold will report to the carbon. The leached ore is then subjected to repeated cycles of releaching with fresh aqua regia and carbon until no significant gold is detected in either the carbon or the liquor for that cycle. This allows previously undetectable gold to be measured. The gold is measured in both the carbon and the leach solution.

In all examples in this patent the cyanide, chlorine and thiourea leaches were performed at ambient temperatures and pressures. Although results are not shown 1 in 5 examples were run as blanks. Abbreviations and symbols (shown in brackets) used in this patent include; pulp density (PD), chlorine (Cl), cyanide (CN), thiourea (Tu), grams per tonne (g/t), parts per million (ppm), micrometers (um), micrograms (ug), grams (g), grams per liter (g/l), high volume aqua regia (HVAR), chloride ion (Cl$^-$), greater than (>), less than (<) carbon in pulp process (CIP), carbon in leach process (CIL), Di-iso-Butyl-Ketone (DIBK), Atomic absorption Spectroscopy (AAS) and percentage (%). Eh millivolts are quoted with respect to the Standard Hydrogen Electrode.

EXAMPLE 1

Test work with clay type ores indicates that more gold is maintained in cyanide solution if the pulp density of the slurry is lowered, all other conditions remaining constant. This is shown by the following results on <38 micron fractions, chosen to avoid any nugget effect.

In this example, three (3) ore samples (<38 ppm) were leached for 6 hours at pH 10.5 and a cyanide concentration of 0.1% W/W. The pulp density varied from 5% to 30%. The pulps were then filtered and the leach liquor analysed for soluble gold by atomic absorption spectroscopy. This result clearly indicates that at the end of the leach more gold is present in the leach liquor when lower pulp densities are used.

| Pulp density of leach solution | Apparent head grade gold detected in liquid |
| --- | --- |
| Ore (1) | |
| 30% | 0.27 g/t |
| 10% | 0.60 g/t |
| Ore (2) | |
| 30% | 0.67 g/t |
| 10% | 1.15 g/t |
| Ore (3) | |
| 30% | 1.90 g/t |
| 10% | 3.90 g/t |
| 5% | 6.90 g/t |

Low pulp density on its own, however, does not release all the gold in solution. When carbon additives of 200 grams/liter were made at the start of the leach, considerably more gold was obtained.

| Pulp density of leach solution | Carbon concentrate (g/l) | Apparent head grade gold detected in liquor or carbon |
| --- | --- | --- |
| Ore (1) | | |
| 10% | 0.0 | 0.60 g/t |
| 10% | 200 | 1.63 g/t |
| Ore (2) | | |
| 10% | 0.0 | 1.15 g/t |
| 10% | 200 | 2.74 g/t |

EXAMPLE 2

An example of the unloading of gold from carbon over time when the pH of the leach liquor is too high is as follows:

Pulp Density 1.0% pH 10.8 Sample Weight 20 g. Carbon concentration 200 g/liter, cyanide concentration 1 ppm.

| Leach Time | total μg gold on carbon | Total gold in Liquor μg |
| --- | --- | --- |
| 0 min | 00 | <0.3 |
| 15 min | 19 | <0.3 |
| 30 min | 10.4 | <0.3 |
| 60 min | 5.3 | <0.3 |
| 360 min | 00 | <0.3 |

The above ore was assayed at 0.25 grams/tonne using fire assay and aqua regia and cyanide leach methods. The maximum extraction of gold onto carbon occurred at about 15 minutes when a recovery of 0.95 grams/tonne was obtained. This represents an increase of 0.7 grams/tonne over the gold assayed by the traditional methods, i.e. with no carbon in the leach solution. As the ore sample used in all of these tests was a cyclone overflow product with a size range of 85% minus 10 μm, 100% minus 18 μm, there was no chance of a nugget effect influencing the results.

Thus there is at least 0.95 grams/tonne gold in this ore which is leachable but 0.7 grams/tonne of which does not report to the liquor in a standard leach test. If an equilibrium is set up between the ore, liquor and carbon, then a change in pulp density from 50% to 1% would be expected to release gold cyanide complexes from the ore and make them available for adsorbtion by the carbon. The following tests were carried out to demonstrate this effect.

| | Initial leach | Dilution stage |
| --- | --- | --- |
| Pulp density | 50% | 1.0% |
| pH | 10.1 | 10.1 |
| Time | 15 min | 30 min |
| CN ppm | 100 | 1.0 |
| Carbon Concentration | 00 | 200 g/l |

Results:
gold on carbon 21.5 μg = 1.07 g/t gold from a 20 gram sample
gold in liquor = 30 μg/liter for 2 liters = 60 μg = 3.0 g/t gold in ore This leach is directly comparable with that in the first part of this example in that the final pulp density, cyanide concentration and carbon concentration were the same.

Thus, for the first leach, a maximum quantity of 0.95 g/t gold was recovered from the carbon with a barren liquor contributing zero gold, for a total of 0.95 g/t head gold.

For the second leach, a grade of 1.07 g/t gold was recovered from the carbon with the liquor contributing another 3.0 g/t gold, for a total of 4.07 g/t gold.

Thus, in this case, it is possible to either leach as CIL at low pulp density, or to leach at high pulp density without carbon and then to dilute into an adsorption circuit at low pulp density with high carbon levels, the second option being preferable in this case.

EXAMPLE 3

If saline water forms part of the pulp and carbon is used as the absorbent medium, it is important for maximum gold recovery that the pH of the pulp entering the column be above pH 8. The carbon will tend to raise the pH of the pulp to an equilibrium pH value which is dependent on the type and conditioning of the carbon present. Passing the pulp through a packed bed column of 2 meters in length at a column velocity of 1 cm/second will enable this equilibrium pH to be attained. If saline water is used in the pulp a lower equilibrium pH is attained for the same entrance conditions. Examples of gold recovery from saline and non-saline pulps passing through a carbon column at various entrance pHs are as follows:

The pulp ore size was <10 μm, cyanide concentration 0.01% pulp density 50% diluted to 1.0% after 30 minutes leaching at initial pH 9.

| Chloride concentration liquor (g/l) | Column Entrance pH | Exit pH | Au ppm in head ore absorbed in on carbon |
| --- | --- | --- | --- |
| 00 | 5.0 | 9.3 | 3.80 |

-continued

| Chloride concentration liquor (g/l) | Column Entrance pH | Exit pH | Au ppm in head ore absorbed in on carbon |
|---|---|---|---|
| 00 | 6.0 | 9.5 | 3.83 |
| 00 | 8.0 | 9.7 | 3.84 |
| 00 | 9.0 | 9.5 | 3.63 |
| 00 | 10.0 | 10.5 | 3.60 |
| 19 | 5.0 | 8.5 | 1.15 |
| 19 | 6.0 | 8.4 | 1.30 |
| 19 | 8.0 | 8.6 | 1.16 |
| 19 | 8.5 | 8.7 | 4.01 |
| 19 | 9.0 | 8.9 | 5.54 |
| 19 repeat | 9.0 | 8.9 | 5.15 |
| 19 | 10.0 | 9.7 | 3.28 |

EXAMPLE 4

In the course of the testwork it was discovered that the presence of chloride ions in the liquor enhanced the recovery of gold per cycle onto carbon. The following table shows the effect of varying the chloride ion concentration in the leach liquor for a series of tests in which all other conditions were the same as in example 3 with the column entrance pH9.

| $Cl^-$ concentration in liquor as g/l | Gold recovered on carbon calculated as ppm in head ore |
|---|---|
| 0.0 | 3.63 |
| 10 | 4.49 |
| 19 (average sea water level) | 5.54 |
| 50 | 5.58 |
| 100 | 3.79 |
| 150 | 2.46 |

It is expected that the presence of other gold complexing agents would give similar results. It is also anticipated that other noble metals would respond similarly to the presence of agents with which they could complex.

EXAMPLE 5

The following are examples of the effect of the desorption time between carbon column passes. The pulp was pumped upwards through three carbon columns in series. In between the carbon contacts, impellor agitated tanks were used to allow desorption residence time for the pulp. The carbon columns were all 2 meters long and the carbon was subsampled in 25 cm lengths along the column. In each case carbon sample A is from the pulp entry end of the column and sample H is from the pulp exit end of the column.

| INITIAL COLUMN 1 | | COLUMN 2 | | COLUMN 3 | |
|---|---|---|---|---|---|
| carbon sample | μg Au on carbon | carbon sample | μg Au on carbon | carbon sample | μg Au on carbon |
| A | 27.7 | A | 9.3 | A | 4.8 |
| B | 22.0 | B | 6.2 | B | 3.6 |
| C | 12.2 | C | 4.5 | C | 2.9 |
| D | 5.9 | D | 3.2 | D | 1.4 |
| E | 3.1 | E | 2.0 | E | 0.6 |
| F | 3.2 | F | 1.2 | F | 0.3 |
| G | 2.0 | G | 0.5 | G | 0.4 |
| H | 1.5 | H | 0.7 | H | 0.3 |

Desorption time between columns was 15 minutes in both cases. In each column the bulk of the gold was loaded on to the first 75 cm of carbon, being carbons subsamples A to C. For columns 2 and 3 the gold loaded onto the A to C carbons subsamples was substantially higher than for the F to H carbons subsamples immediately preceeding them. Calculations based on this data indicate that if desorption stages were not included between the carbon contacting stages, extremely long carbon columns would be required to obtain similar recoveries.

EXAMPLE 6

The following is an example showing the lessened recovery of gold from a pulp, when zones of high pulp density are allowed to form on or in the absorbent material where the recovery is by adsorption onto carbon. The ore used is a <10 82 m fraction, chosen to avoid any nugget effect. After leaching and dilution to 1% PD, the agitated pulp had one portion of 2 liters passed through a carbon column and another portion of 10 liters passed through an identical column containing fresh carbon. The carbons were ashed and then subjected to an aqua regia digest followed by DIBK extraction. The DIBK was analysed for gold by AAS.

| | 2 liter contact | 10 liter contact |
|---|---|---|
| μg Au detected on carbon | 74 | 107 |
| carbon ash residue weight (g) | 3.7 | 11.3 |

Thus, the carbon from the 10 liter contact adsorbed only 1.5 times as much gold as the carbon from the 2 liter contact. The only difference between the two contacts was the much greater quantity of solids entrapped in the carbon during the 10 liter contact.

Thus for recovery of metal values from a pulp or partially clarified liquor, a preferred process adsorbent would be one with minimal surface irregularities and internal pores and fissures and having the metal bonding sites on the outer surface. Such an adsorbent is ion exchange fibre, but other adsorbents which minimise the formation of areas of high pulp density in, on or around the adsorbent material may also be used.

EXAMPLE 7

The following is an example of the leaching of gold ores using complexing agents other than cyanide. The ore used in the first example was the <10 μm fraction of an alluvial ore.

| Head grade (fire assay) | 0.26 ppm Au |
|---|---|
| Head grade (aqua regia) | 0.21 ppm Au |
| Head grade (standard CN bottle roll) | 0.20 ppm Au |
| Head grade (modified CN leach 1% P.D.) | 1.01 ppm Au |
| Head grade (modified Tu leach 1% P.D.) | 2.81 ppm Au |

The modified CN leach conditions were - 0.1% CN, P.D. 1%, pH 10.3, Time 30 mins.
The modified Tu leach conditions were - 0.1% Tu, P.D. 1%, pH 10, Time 30 mins.

After leaching, both the pulps were separately passed through 1 meter long carbon columns at a flow velocity of 1 cm/sec. The gold adsorbed onto the carbon was analysed by a standard ashing of the carbon followed by boiling of the ash with aqua regia. The gold was extracted from the aqua regia into DIBK which was analysed for its gold content by AAS. Thus in the above example both modified cyanide and thiourea leaches extracted more gold than traditional methods of extraction and analysis, with the thiourea leach giving a greater gold value than the cyanide leach.

EXAMPLE 8

This example is a refractory sulphide ore milled to <10 μm

| | |
|---|---|
| Head grade (fire assay) | 20.82 ppm Au |
| Head grade (aqua regia) | 10.21 ppm Au |
| Head grade (standard CN bottle roll) | 5.62 ppm Au |
| Head grade (modified CN leach) | 21.39 ppm Au |
| Head grade (modified Cl leach) | 24.58 ppm Au |

The modified CN leach conditions were - 0.1% CN, P.D. 1%, pH 10.5, Time 6 Hr. The modified Cl leach conditions were - Cl pulp eH 1000 millivolts, P.D. 1%, pH 6.3, Time 6 Hr.

Both the chlorine and cyanide leaches were run as CIL, with carbon quantities of 200 g/l. The gold adsorbed on the carbon was analysed as described in the example 7. The results show that both the modified cyanide and chlorine leaches extracted more gold than traditional methods of extraction and analysis, with the chlorine leach giving a greater gold value than the cyanide leach.

EXAMPLE 9

The following is an example of an ore leached by cyanide both with and without dispersants added to the pulp at the dispersant addition rate of 1 g/l.

| Leach Pulp Density % solids by weight | Carbon Concentration (g/l) | Dispersant (all 1 g/l) | Apparent head grade from gold detected in the liquor or on the carbon (ppm) |
|---|---|---|---|
| 5 | 00 | Nil | 1.59 |
| 5 | 200 | Nil | 1.85 |
| 5 | 200 | Sodium silicate | 2.34 |
| 5 | 200 | Sodium carbonate | 1.81 |
| 5 | 200 | tri-Sodium polyphosphate | 2.05 |
| 5 | 200 | Sodium hexametaphosphate | 3.02 |
| 5 | 200 | Cyquest 3223 | 1.91 |
| 10 | 00 | Nil | 1.40 |
| 10 | 200 | Nil | 1.53 |
| 10 | 200 | Sodium hexametaphosphate | 1.94 |
| 10 | 200 | Cyquest 3223 | 1.85 |

From the above results it appears that the dispersants are most effective for this ore at pulp densities of <10 % solids by weight.

EXAMPLE 10

This is an example of the use of ion exchange resin instead of carbon as a gold adsorbent. Gold recovery is from an ore sized at <10 μm. This ore was assayed by fire assay at 0.15 ppm Au.

The ore was leached for 20 minutes at 50% PD with 0.01% CN added at a pH of 9.0. The pulp was diluted to 1% PD by the addition of a liquor containing 20 g/l of Cl⁻ ions as sodium chloride. After dilution and adjustment of the pH to 9.0, the pulp was passed through a column containing a packed bed of a weak base ion exchange resin. The resin used was PAZ4, developed by SELA INC. New York, U.S.A. The pulp flow velocity through the column was 1 cm/sec. After being contacted by the pulp, the resin was removed from the column, washed, dried and ashed at 600° C. The ashed residue was digested in aqua regia and the aqua regia was contacted with DIBK which was analysed for gold by AAS. The gold detected represented a head grade of 1.36 ppm Au in the original ore, a duplicate had a grade of 1.24 ppm au in the original ore. Thus the use of resin as an adsorbent allowed the detection of 1.21 ppm gold in the head ore over and above that detected by fire assay.

EXAMPLE 11

The following example indicates the desorbing effect of methanol at high and low pulp densities and the inability of carbon to recover gold from a pulp containing methanol.

| Ore type - alluvial fines | <38 μm |
|---|---|
| Standard aqua regia assay | 0.03 ppm Au calculated as gold in head |
| Standard bottle roll cyanide | 0.02 ppm |
| HVAR assay | 1.40 ppm |

| | Modified | Gold from liquor ppm | Gold from carbon ppm | Total gold ppm |
|---|---|---|---|---|
| a) | CN leach at P.D. 30% (no carbon) | 0.12 | 0.0 | 0.12 |
| b) | CN leach at P.D. 30% (no carbon) +1 g/l Methanol | 0.20 | 0.00 | 0.20 |
| c) | CN leach + 200 g/l carbon | | | |
| d) | P.D. 30% | 0.06 | 0.28 | 0.34 |
| e) | CN leach + 200 g/l carbon P.D. 30% + Methanol 1 | 0.20 | 0.13 | 0.33 |

|   |   |   | g/l |   |   |   |
|---|---|---|---|---|---|---|
| f) | " | CN leach at P.D. 5% (no carbon) | | 0.92 | 0.00 | 0.92 |
| g) | " | CN leach at P.D. 5% +1 g/l (no carbon) Methanol | | 4.30 | 0.00 | 4.30 |
| h) | " | CN leach + 200 g/l carbon P.D. 5% | | 0.04 | 4.55 | 4.61 |
| i) | " | CN leach + 200 g/l carbon P.D. 5% + Methanol 1 g/l | | 4.06 | 0.79 | 4.85 |

EXAMPLE 12

In another aspect of the patent, the recovery of metal values was accomplished by cementation onto zinc shavings. The ore used was sized at <10 μm and had a head grade by fire assay of 0.18 ppm Au. After leaching and dilution the pulp had a condition of pH 8.5, CN 1 ppm and pulp density of 1%. The pulp was split into two parts, each of 2 liters volume. The pH of Part 1 was adjusted with sodium hydroxide to 9.0 and the pH of the other part was adjusted with sodium hydroxide to 10.0. Each pulp was passed through a separate column containing zinc shavings. The zinc shavings were dissolved in aqua regia and the gold values were extracted into DIBK and analysed by AAS. The results were as follows:

| Pulp pH | μg Au analysed as cemented onto zinc |
|---|---|
| 9.0 | 18.4 |
| 10.0 | 45.6 |
| Blank | 0.0 |

For the 20 grams of ore present in each 2 liters of pulp, the recovered gold represented an apparent head grade of 0.92 ppm Au for the pH 9.0 pulp and an apparent head grade of 2.23 ppm Au for the pH 10.0 pulp. Both of these grades are in excess of the 0.18 ppm Au analysed by fire assay. Thus, the use of zinc will allow the recovery of gold values from the process, the said values being greater than the values detected by traditional analysis. Deoxygenation was not applied to the pulp, this represents a significant difference from standard zinc cementation procedures which claim that the presence of CN levels in the pulp of 100 ppm or greater and deoxygenation are essential for successful gold recovery by this method.

EXAMPLE 13

Analytical Technique

The analysis of the carbon must be modified on account of the fine clay which enters into and is trapped within the carbon granules. When the carbon is washed, dried and ashed according to the standard carbon analysis method, this entrapped clay is inseparable from the ash. The standard procedure is to contact the carbon residue with aqua regia and to calculate the gold content of the ash from the analysis of the aqua regia solution.

However, it has been found that substantial amounts of the gold are adsorbed by the clay or other fine material remaining with the carbon ash. The gold may be removed from this material by recontacting the filtered residue from the initial aqua regia digest with fresh aqua regia containing 20 g of carbon. This carbon is then ashed and digested with aqua regia as before.

However, some of the clay is entrapped in the carbon used in this second digestion, necessitating a repeat of the cycle on this carbon ash. This cycle is repeated until the gold assayed per cycle becomes statistically insignificant. Not all of the gold is extracted from the original ashed residue by this method, and repeated contacts of aqua regia and carbon are made until the gold extracted per cycle is again statistically insignificant. This method of aqua regia analysis using a low pulp density slurry and carbon may also be used on the head ore as well as carbon residues. In this case as well as in cyanide leaching, it is found that the lower the pulp density the higher the quantity of recovered gold. There is a practical limitation for the handling of aqua regia in this method, it is found that the leaching of 20–25 g of ore in 500 milliliters aqua regia with 20 g carbon is a good working volume of aqua regia with an acceptable sample size. An example of the high volume aqua regia technique on a head ore is shown. The ore was a calcine tailing from Cripple Creek in Colorado, U.S.A. of size less than 38 μm. Head assay by fire assaay is 1.43, (repeat 1.45 ppm) Head assay by aqua regia/AAS wass 1.10 ppm, (repeat 1.13 ppm) Conditions of the high volume aqua regia (HVAR) were 25 g solids, 500 milliliters aqua regia, 20 g carbon, 2 hr contact time.

The following flow sheet indicates the total analytical procedure undertaken.

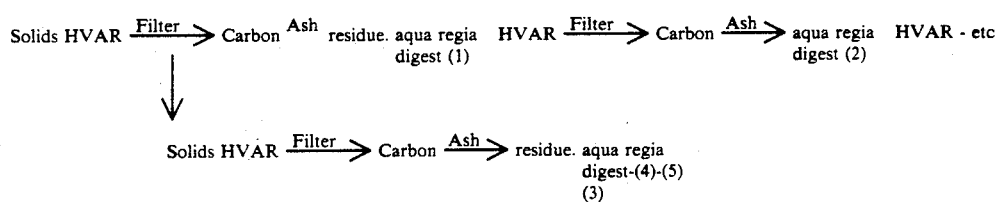

-continued

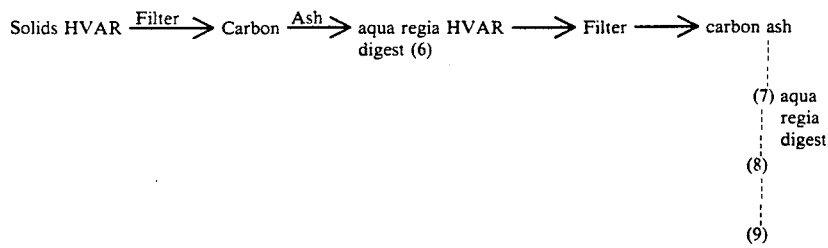

Analysis (1) is HVAR cycle (1)
     (2) is HVAR cycle (1A)
     (3) is HVAR cycle (2)
     (4) is HVAR cycle (2A)
     (5) is HVAR cycle (2B)
     (6) is HVAR cycle (3)
     (7) is HVAR cycle (3A)
     (8) is HVAR cycle (3B)

The analysis need not limited to these cycles, but may be extended

The following table shows the gold recovered at each stage.

| micrograms of gold extracted per stage | |
|---|---|
| (1) | 27.6 |
| (2) | 8.5 |
| (3) | 1.9 |
| (4) | 8.6 |
| (5) | 1.1 |
| (6) | 0.4 |
| (7) | 3.9 |
| (8) | 0.5 |
| (9) | <0.3 |
| Total: | 52.5 µg |

This represents a head grade of 2.1 g/t compared with the conventional aqua regia assayed grade of 1.10 g/t and the conventional grade by fire assay of 1.43 g/t.

EXAMPLE 14

An example of the HVAR technique used on a carbon from a modified cyanide leach is described in the following flow sheet

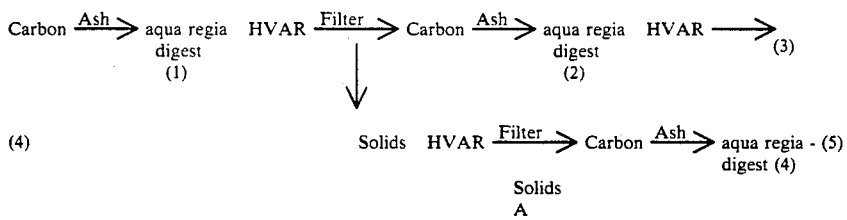

The results showing the gold recovered at each stage is set out below:

| Micrograms of gold extracted per stage | |
|---|---|
| (1) | 81 |
| (2) | 93.5 |
| (3) | 11.9 |
| (4) | 60.0 |
| (5) | 7.7 |

The 81 µg of stage (1) represents the gold extracted by a standard aqua regia digest of an ashed carbon. Stages (2) to (5) represent the extra 173.1 µg of gold extracted by HVAR. It is obvious that a third cycle of HVAR on the solids marked (A) would extract more gold, as would further cycles of HVAR after analyses (3) and (5).

A shortcoming of the HVAR cycling technique is that, because it is done with hot aqua regia, an equilibrium is set up between the ore solids, the carbon and the liquor. With some ore types the equilibrium favours the ore solids and so very little gold reports to the carbon or to the liquor.

This effect may be lessened by using a cold leaching process. This involves the use of ambient temperature cyanide and aqua regia leaches with either carbon or an organic extractant such as DIBK in the leach. The organic extractant is preferred as it may be read directly for gold content on an analyser such as an atomic absorption spectrophotometer.

By repeating the cycles of aqua regia and cyanide leaches on the solids residue, gold is extracted at each cycle until such time as the gold extracted is statistically insignificant. Care must be taken to wash the solids residue so that it is free from liquor contamination from the previous cycle. This is to prevent an aqua regia-cyanide reaction, with the formation of toxic hydrogen cyanide gas.

An example illustrating the extra gold extracted by this method follows: An ore (20 g sample) having a size less than 10 micron was assayed by repeated HVAR cycles. A total of 42 micrograms of gold was obtained, with the last two HVAR cycles reporting <0.3 micrograms per cycle. This represents a head grade of 2.1 g/t. The residue was then subjected to repeated alternating cycles of cyanide-DIBK and aqua regia-DIBK leaches. The 1st cycle on the HVAR residue by cyanide-DIBK extracted 9.3 micrograms. The 1st cycle on the cyanide-DIBK residue by aqua regia-DIBK extracted 9.1 micrograms The 2nd cycle by cyanide-DIBK on the aqua regia-DIBK residue extracted 6.9 micrograms The 2nd cycle by aqua regia-DIBK on the cyanide-DIBK residue extracted 7.6 micrograms Obviously further cycles would extract further gold. However a total of 32.9 micrograms extra has been extracted by the cyanide-DIBK and aqua regia-DIBK cycles. These 32.9 micrograms could not be extracted by HVAR cycles and represent a grade of 1.6 g/t over and above the 2.1 g/t analysed by HVAR techniques.

EXAMPLE 15

A wet chemical analysis for silver was carried out on a 20 g ore sample and the residue was retreated in 500 milliliters of acid with 20 g of carbon added as per a high volume aqua regia cycle 1 (HVAR 1) analysis for gold. Further cycles corresponding to HVAR cycles 2, 1A and 2A were carried out. The results were as follows.

| Standard analysis | 3.5 ppm Ag |
| --- | --- |
| HVAR cycle 1 | 2.6 ppm |
| HVAR cycle 2 | 1.2 ppm |
| HVAR cycle 1A | 3.8 ppm |
| HVAR cycle 2A | 0.8 ppm |
| Total | 8.4 ppm Ag |

Thus the method of analysis for silver of dilute leaching of an ore with a silver adsorbent in the leach results in higher levels of silver being analysed than by the standard method. It is anticipated that this effect would extend to other noble metals, with the analysis and recovery being similar to that used for gold, but with leachants and adsorbents suitable for that particular material.

EXAMPLE 16

Apart from the effects of low pulp density and high carbon additions, there is a third factor which is noticeable in some ores. This is the sizing and separate processing of various size fractions of the ore. A convenient size for wet screening is 38 micrometers. The effect of sizing and leaching the 2 fractions separately is shown.

High Clay Ore - sizing + 38 μm fraction 70.1% by weight —
38 μm fraction 29.9% by weight
leach conditions for the head and the two fractions
Pulp Density 5%   CN 0.1%   pH 10.5
Carbon 200 g/liter, 6 hr/each time
The gold grades determined from the leaching process were:-
Head 1.10 g/t + 38 μm 1.65 g/t − 38 μm 2.73 g/t
Calculated head from fractions = 1.973 g/t
Hard Rock Haematite Ore   +38 μm fraction 63.2% by weight —
38 μm fraction 36.8% by weight The calculated fire assay head grade from analysis of the fractions was 4.52 g/t Au.

When leached under the same conditions as the above example the determined gold grades were: +38 μm fraction 9.76 g/t-38 μm fractions 6.12 g/t Calculated head from fractions = 8.420 g/t. For any particular ore, a size in the range of 2 to 100 microns needs to be selected. In some cases milling the ore to below the critical size may be a practical alternative to the separate treatment of the two size fractions.

From the above it can be seen that this invention provides a unique method of assaying and of recovering gold that was not previously detected.

I claim:

1. In a method of recovering noble metal values from a noble metal-containing material selected from the group consisting of ores, ore concentrates or tailings by treating the material with a leaching agent and a lixiviant to dissolve therefrom noble metal, thereby forming a leach slurry containing a solution of noble metal and solids in a concentration referred to as "pulp density", and subsequently recovering dissolved noble metal from the leach slurry by using a collecting agent, the improvement comprising diluting the leach slurry to reduce its pulp density to below 15% solids by weight, and including avoiding the formation in the slurry during the recovery step of localized zones of pulp density above 15% solids by weight, to thereby increase the yield of noble metal recovered from the material.

2. A method as claimed in claim 1 in which the dilution is carried out after completion of the leaching stage, and the dilute pulp is held for a time sufficient to increase the quantity of noble metal in solution prior to commencement of the recovery stage.

3. A method as claimed in claim 1 or 2 wherein the leach slurry is diluted to a pulp density of 0.1 to 10% solids by weight.

4. A method as claimed in claim 1 or 2 in which the lixiviant is chloride ion.

5. A method as claimed in claim 1 or 2 in which the noble metal is recovered by using as the collecting agent carbon or an ion exchange resin or fibre.

6. A method as claimed in claim 5 in which the collection agent is held in a series of short columns and the solution of the noble metal is passed through the series of columns.

7. A method as claimed in claim 5 in which at least 65 grams of the carbon or ion exchange resin are used per liter of the solution.

8. A method as claimed in claim 2 in which the leaching stage is carried out at pulp densities above 40% solids by weight, the solids are separated from the solution, the solution is treated to extract therefrom noble metal, and the solids are repeatedly treated with recycled solution from the metal extraction stage or with fresh leaching solution until the solids have effectively been treated with the volume of that solution equivalent to the desired solution.

9. A method as claimed in claim 1 or 2 wherein a solution agent is used to increase the quantity of metal in solution following the leaching stage.

10. A method as claimed in claim 9 wherein the solution agent is a short chain polar organic compound.

11. A method as claimed in claim 1 or 2 wherein a dispersant is added prior to or after dilution of the slurry to thereby increase the amount of noble metal in solution.

12. A method as claimed in claim 1 wherein said noble metal is gold which is recovered from said material by leaching at pulp densities above 10% solids by weight and at the end of the leach stage, diluting the leach slurry to a pulp density between 0.1% and 10% solids by weight and holding the diluted leach slurry for up to 15 minutes prior to separation of the gold-containing solution from the solids, and passing the separated solution through a series of columns containing carbon or ion exchange resin.

13. A method as claimed in claim 12 wherein the leach slurry passes to a dilution tank after the leaching stage and after the pass of the gold-containing solution through a carbon or ion exchange resin column, the separated solids are diluted with gold depleted solution and held in a recirculating tank for a period sufficient to allow further gold to enter into solution, followed by further separation of solids and gold extraction from the liquor in the carbon or ion exchange resins.

14. A method according to claim 10 wherein the organic compound is methanol.

15. A method according to claim 10 wherein the organic compound is acetone.

16. A method as claimed in any one of claims 1, 2, or 8 in which the method of recovery of the noble metal is selected from cementation, electrowinning or precipitation.

17. A method according to claim 1, 2 or 8 wherein the noble metal recovered from said material consists essentially of gold.

* * * * *

UNITED STATES PATENT AND TRADEMARK OFFICE
CERTIFICATE OF CORRECTION

PATENT NO. : 5,215,575

DATED : June 1, 1993

INVENTOR(S) : Dean R. Butler

It is certified that error appears in the above-indentified patent and that said Letters Patent is hereby corrected as shown below:

Column 1, line 29, after "50%", insert a comma.

Column 3, line 35, delete "leach" and insert --liquor-- therefor.

Column 3, line 38, delete "leach" and insert --liquor-- therefor.

Column 3, line 48, delete "into" and insert --onto-- therefor.

Column 4, line 45, delete "or" and insert --of-- therefor.

Column 5, line 52, delete "than" and insert --that-- therefor.

Column 8, delete lines 23 and 24 and insert therefor:
   --Carbon
      Concentration      00      200 g/l--.

UNITED STATES PATENT AND TRADEMARK OFFICE
CERTIFICATE OF CORRECTION

PATENT NO. : 5,215,575
DATED : June 1, 1993
INVENTOR(S) : Dean R. Butler It is certified that error appears in the above-identified patent and that said Letters Patent is hereby corrected as shown below:

Column 10, line 15, delete "82 m" and insert --$\mu$m-- therefor.

Column 10, line 66, delete "DIBK" and insert --D1BK-- therefor.

Signed and Sealed this

Fifth Day of December, 1995

*Attest:*

*Attesting Officer*

BRUCE LEHMAN

*Commissioner of Patents and Trademarks*